(12) United States Patent
Huang et al.

(10) Patent No.: US 9,969,461 B2
(45) Date of Patent: May 15, 2018

(54) CENTER-MOUNTED CONTROL SYSTEM OF BICYCLE

(71) Applicant: Suzhou Tergar Iot Technology Co., Ltd, Suzhou (CN)

(72) Inventors: Fuming Huang, Suzhou (CN); Yunfei Li, Suzhou (CN); Junning Huang, Suzhou (CN); Hualin Cai, Suzhou (CN); Qiang Zhang, Suzhou (CN)

(73) Assignee: Suzhou Tergar Iot Technology Co., Ltd (CN)

( * ) Notice: Subject to any disclaimer, the term of this patent is extended or adjusted under 35 U.S.C. 154(b) by 247 days.

(21) Appl. No.: 14/908,056

(22) PCT Filed: Aug. 8, 2014

(86) PCT No.: PCT/CN2014/083951
§ 371 (c)(1),
(2) Date: Jan. 27, 2016

(87) PCT Pub. No.: WO2015/096485
PCT Pub. Date: Jul. 2, 2015

(65) Prior Publication Data
US 2016/0159434 A1 Jun. 9, 2016

(30) Foreign Application Priority Data

Dec. 26, 2013 (CN) .......................... 2013 1 0729428
Dec. 26, 2013 (CN) ..................... 2013 2 0865134 U

(51) Int. Cl.
*B62M 6/50* (2010.01)
*B62M 6/55* (2010.01)
*B62M 6/45* (2010.01)

(52) U.S. Cl.
CPC ............... *B62M 6/55* (2013.01); *B62M 6/45* (2013.01); *B62M 6/50* (2013.01)

(58) Field of Classification Search
CPC ....................................................... B62M 6/50
See application file for complete search history.

(56) References Cited

U.S. PATENT DOCUMENTS 8,886,376 B2  11/2014 Aoki et al.
9,739,608 B2 *  8/2017 Belon ....................... G01B 7/30
(Continued)

FOREIGN PATENT DOCUMENTS

CN  201177539       1/2009
CN  101890691 A   11/2010
(Continued)

OTHER PUBLICATIONS

Australian Patent Examination Report No. 1, dated Jul. 7, 2016, 5 pages.
(Continued)

*Primary Examiner* — Tisha D Lewis
(74) *Attorney, Agent, or Firm* — Dority & Manning, P.A.

(57) ABSTRACT

A center-mounted control system for a bicycle includes a torsion detector, a torque transducer, first and second wireless transceiving units, and a control unit. The torsion detector is sleeved on a crank shaft and detects a torque signal of the crank shaft and transmit the detected torque signal to the torque transducer; the torque transducer is fixedly connected to the torsion detector and senses the torque signal transmitted from the torsion detector and sends the torque signal to the first wireless transceiving unit; the control unit receives and processes the torque signal and controls an electrical motor according to the processed torque signal; and a first clutch of the bicycle is sleeved on the crank shaft and is fixedly connected to one end, close to a chain ring, of the torsion detector, and the first clutch of the bicycle is fixedly connected to the chain ring.

19 Claims, 5 Drawing Sheets

(56) References Cited

U.S. PATENT DOCUMENTS

2010/0265097 A1 10/2010 Obatake et al.
2011/0183805 A1 7/2011 Chan
2013/0086996 A1 4/2013 Yao et al.

FOREIGN PATENT DOCUMENTS

| CN | 201983887 U | | 9/2011 | | |
| --- | --- | --- | --- | --- | --- |
| CN | 102297736 A | | 12/2011 | | |
| CN | 102464080 A | | 5/2012 | | |
| CN | 202350960 U | | 7/2012 | | |
| CN | 203186536 U | | 9/2013 | | |
| CN | 203186537 U | | 9/2013 | | |
| CN | 103661773 A | | 3/2014 | | |
| CN | 203652054 U | | 6/2014 | | |
| CN | 203698571 U | | 7/2014 | | |
| DE | 102009029658 A | * | 3/2011 | ............. | B62M 6/40 |
| EP | 2028098 A2 | | 2/2009 | | |
| EP | 2460718 | | 6/2012 | | |
| EP | 2460718 A1 | | 6/2012 | | |
| JP | 2000142550 A | | 5/2000 | | |
| JP | 2001122182 | | 5/2001 | | |
| JP | 2004345400 | | 12/2004 | | |
| JP | 2005225489 | | 8/2005 | | |
| JP | 2007030879 | | 2/2007 | | |
| JP | 5299668 B2 | | 9/2013 | | |
| TW | 201223823 A | | 6/2012 | | |
| WO | WO2011088722 A1 | | 7/2011 | | |
| WO | WO2011155817 A1 | * | 12/2011 | ............. | B62M 6/50 |

OTHER PUBLICATIONS

Office Action from Japanese Patent Application No. 2016-535320, dated Mar. 7, 2017, 4 pages.
First Office Action for CN Application No. 201310729428.5, dated Jul. 3, 2015.
International Search Report for International Application No. PCT/CN2014/083951, dated Nov. 2, 2014.
Supplementary European Search Report for EP 14874124 dated Jul. 7, 2017, 3 pages.
Office Action from Canadian Intellectual Property Office, dated Dec. 12, 2016, 3 pages.

* cited by examiner

CENTER-MOUNTED CONTROL SYSTEM OF BICYCLE

This application is the national phase application of International Application No. PCT/CN2014/083951, titled "CENTER-MOUNTED CONTROL SYSTEM OF BICYCLE" and filed on Aug. 8, 2014, which claims the benefit of priorities to Chinese Patent Application No. 201310729428.5, titled "CENTER-MOUNTED SYSTEM BASED ON WIRELESS TORQUE DETECTION" and filed with the Chinese State Intellectual Property Office on Dec. 26, 2013, and Chinese Patent Application No. 201320865134.0, titled "WIRELESS TORQUE DETECTION SYSTEM FOR CENTRAL SHAFT OF BICYCLE" and filed with the Chinese State Intellectual Property Office on Dec. 26, 2013, the entire disclosures of which are incorporated herein by reference.

TECHNICAL FIELD

The present application relates to the field of power assist bicycle driving techniques, and particularly to a center-mounted control system for a bicycle which can realize zero-speed start.

BACKGROUND

Most of the current electric bicycles are driven by a wheel hub motor, and in the wheel hub driving manner, an electrical motor is disposed on a front wheel or a rear wheel of the bicycle, which causes the center of gravity of the whole bicycle to deflect forward or rearward, thus does not conform with the common riding manner, and the speed of the bicycle is completely controlled by a rotation handle, therefore large traffic hidden dangers exist. At the same time, such wheel hub type mechanical structure increases the difficulties in assembling, and examining and repairing, which virtually increases the using cost and failure rate of the electric bicycle. A center-mounted control system refers to releasing the electrical motor from the front wheel or the rear wheel of the bicycle, the center-mounted control system employs a high-speed brushless direct-current motor instead of the wheel hub motor, and the high-speed brushless direct-current motor is mounted on a crank shaft of the bicycle. The center-mounted control system integrates a speed sensing (or a torque sensing) with the electrical motor control to control the normal driving of the whole bicycle, thus is a core component for the power assist bicycle. Using of the center-mounted control system may overcome the disadvantages of the conventional electric bicycle, has an excellent riding effect, and will undoubtedly become the developing direction of the electric bicycles.

In addition, most of the center-mounted control systems for the power assist bicycle available in the market use a speed transducer for feeding back the speed (that is the speed of a foot pedal being stepped by an rider) to control a driving force of the electrical motor. The driving force outputted by the electrical motor is directly proportional to the speed, thereby realizing power assistance. A center-mounted system based on speed detection has a certain power assistance effect under a normal road condition, however in the case that the rider rides against the wind, or rides on a road condition with a high resistance and a heavy load such as an upslope, the driving force outputted by the electrical motor is small because of the low riding speed, thus the power assistance effect cannot be realized, and the riding effect is bad, therefore the center-mounted system based on speed detection cannot be accepted by the mainstream market. Therefore, the best solution is to employ a torque transducer to feed back a force of the rider stepping on the foot pedal, so as to control the driving force of the electrical motor, and the larger the torque is, the larger the driving force is.

However in the conventional torque detection, a human power is converted into an angular displacement, two magnetic rings are staggered, and an angle corresponding to the relative motion is detected via a Hall sensor, thus the torque of the rider stepping on the foot pedal can be detected. However for the torque detection based on the magnetic rings and the Hall sensor, the mechanical structure is complicated, and the requirement for the installation accuracy is very high, thus disadvantages are apt to occur in a later period, for example a measuring error may be caused by falling of the bicycle. Besides, the conventional center-mounted system based on the torque detection also has the following problems. 1. The torque transducer is directly arranged on the crank shaft, for example, a torque sensing system arranged on a crank shaft of a bicycle is described in the Patent Application No. 201010548510.4. In this system, the transmission process of the torque when a left-side foot pedal is hardly stepped by the rider is from the left-side foot pedal to the crank shaft, to the torque transducer, and then to a chain ring, that is, the torque transducer can detect the torque before the chain ring rotates, thus may timely drive the electrical motor to assist the human-powered riding. However in the case that the force is applied on a right-side foot pedal, the transmission process of the torque is from the right-side foot pedal to the crank shaft and then to the chain ring, thus when the chain ring already rotates, the torque transducer cannot detect the torque, thus cannot drive the electrical motor. An existing solution is to simulate a left torque and a right torque via a software after the bicycle being started, therefore the existing torque transmission method cannot realize a zero-speed start, which has a had riding effect, moreover, most people are accustomed to starting the bicycle with the right foot, thus according to the above analysis, such solution has no advantage at all. 2. The electrical motor is directly educed through a reduction gear mechanism to be connected to the chain ring, thus when the speed of the rider stepping on the foot pedal is greater than the speed of the electrical motor, the human force may drive the electrical motor to rotate, which increases the load of the human body. Particularly, when a power source of the center-mounted system is closed, the rider may bear a rotating load of the electrical motor during the riding process, thus riding such bicycle is more strenuous than riding an ordinary bicycle. 3. For the signal processing mode of the existing center-mounted system, detected torque signals are generally performed with only simple signal processing and then are all sent to a controller, therefore the dependency of the center-mounted system on the controller is increased to a certain extent, and meanwhile a certain demand for function of the controller is put forward, which reduces a selection model range of the controller, and weakens the versatility of the center-mounted system. 4. The existing center-mounted system employs the Hall sensor to detect only a rotation speed signal of the chain ring, and cannot realize a double control of the rotation speed and a rotation direction of the chain ring, thus cannot assist the electrical motor well in controlling, and misoperation, or bicycle flying-off and other dangerous phenomena may even occur.

SUMMARY

An object of the present application is to overcome the disadvantages of the conventional technology and provide a center-mounted system based on wireless torque detection, which may realize a zero-speed start, has a good riding effect, and meanwhile can be adapted to all road conditions and can obtain a good power assistance effect in both a low-speed riding and a high-speed riding.

For realizing the above objects, the following technical solutions are provided according to the present application. A center-mounted control system for a bicycle includes a torsion detector, a torque transducer, a first wireless transceiving unit, a second wireless transceiving unit, and a control unit. The torsion detector is sleeved on a crank shaft of the bicycle and configured to detect a torque signal of the crank shaft and transmit the detected torque signal to the torque transducer. The torque transducer is fixedly connected to the torsion detector and configured to sense the torque signal transmitted from the torsion detector and send the torque signal to the first wireless transceiving unit. The first wireless transceiving unit is electrically connected to the torque transducer and configured to receive the torque signal and send the torque signal to the second wireless transceiving unit. The second wireless transceiving unit is configured to receive the torque signal and send the torque signal to the control unit. The control unit is configured to receive the torque signal, process the torque signal and control an electrical motor of the bicycle according to the processed torque signal. A first clutch of the bicycle is sleeved on the crank shaft and is fixedly connected to one end, close to a chain ring, of the torsion detector, and the first clutch of the bicycle is fixedly connected to the chain ring configured to install a chain of the bicycle.

Preferably, one end, away from the chain ring, of the torsion detector is connected to the crank shaft via a first spline, and one end, close to the chain ring, of the torsion detector is fixedly connected to the first clutch via a second spline.

Preferably, the center-mounted control system further includes a speed and direction detecting unit configured to detect a rotation speed signal and a rotation direction signal of the chain ring and transmit the rotation speed signal and the rotation direction signal to the first wireless transceiving unit. The first wireless transceiving unit is further configured to receive the rotation speed signal and the rotation direction signal and send the rotation speed signal and the rotation direction signal to the second wireless transceiving unit. The second wireless transceiving unit is further configured to receive the rotation speed signal and the rotation direction signal and then transmit the rotation speed signal and the rotation direction signal to the control unit. The control unit is further configured to receive and process the rotation speed signal and the rotation direction signal, and control the electrical motor according to the processed torque signal, the processed rotation speed signal and the processed rotation direction signal.

Preferably, the center-mounted control system further includes a magnetic ring, the speed and direction detecting unit is a Hall sensor, and the Hall sensor includes two Hall chips and a peripheral circuit for the chips. The Hall sensor is configured to detect a magnetic signal of the magnetic ring, obtain a rotation speed signal according to the magnetic signal and output the rotation speed signal, and obtain a rotation direction signal of the chain ring according to a phase difference between two detected magnetic signals and output the rotation direction signal.

Preferably, the center-mounted control system further includes a wireless power supply unit configured to supply power to the crank shaft, the torsion detector and the first clutch, an outer ring, and an inner ring inserted in the outer ring and rotatable with respect to the outer ring. The wireless power supply unit includes an inner coil and an outer coil. The inner ring is sleeved on the torsion detector, and is rotatable together with the torsion detector. Two first annular grooves are provided in an outer surface of the inner ring, and two second annular grooves are provided in an inner surface of the outer ring at positions corresponding to the first annular grooves. The inner coil is located in one of the first annular grooves, and the outer coil is located in the respective the second annular groove. The magnetic ring is located in another first annular groove, and the speed and direction detecting unit is located in another second annular groove.

Preferably, the center-mounted control system further includes a first housing mounted in a bottom bracket of the bicycle. The torsion detector, the torque transducer, the speed and direction detecting unit, the first clutch, the first wireless transceiving unit, the inner ring, the outer ring, and the wireless power supply unit are all located inside the first housing. The outer ring is fixedly connected to the first housing, and the first wireless transceiving unit is fixed on the outer surface of the inner ring. A middle section of the crank shaft is inserted in the first housing, and two ends of the crank shaft are exposed outside the first housing.

Preferably, a seal ring is provided at one end, away from the chain ring, of the first housing; one end, away from the chain ring, of the middle section of the crank shaft is connected to the seal ring via a first bearing, and another end of the middle section of the crank shaft is fixedly connected to the chain ring.

Preferably, the center-mounted control system further includes a transmission mechanism. The transmission mechanism includes a transmission shaft, and a second clutch sleeved on the transmission shaft. A motor shaft of the electrical motor is configured to mesh with a gear on the second clutch, and the transmission shaft has one end inserted in the electrical motor and another end meshing with the gear on the first clutch via a through hole provided in the first housing.

Preferably, the center-mounted control system further includes a second housing fixedly connected below the first housing. The electrical motor, the control unit, the transmission mechanism and the second wireless transceiving unit are arranged inside the second housing. Another end of the transmission shaft is configured to mesh with the gear on the first clutch via a through hole provided in the second housing.

Preferably, the gear is a plastic gear.

Preferably, the center-mounted control system further includes at least one interface of Internet of vehicles arranged in the second housing.

Preferably, the first housing and the second housing form a sealed housing.

Preferably, the center-mounted control system further includes a battery monitoring and protecting unit electrically connected to the first wireless transceiving unit and configured to send a collected electrical signal parameter of a power supply battery of the bicycle to the first wireless transceiving unit and control the power supply battery according to a control instruction received from the first wireless transceiving unit. The first wireless transceiving unit is further configured to send a received electrical signal parameter to the second wireless transceiving unit, and send a control instruction received from the second wireless transceiving unit to the electronic motor monitoring and protecting unit. The second wireless transceiving unit is further configured to send the received electrical signal parameter to the control unit, and send the received control instruction to the first wireless transceiving unit. The control unit is further configured to receive the electrical signal parameter and generate a corresponding control instruction based on the electrical signal parameter, and send the control instruction to the second wireless transceiving unit.

Preferably, the center-mounted control system further includes a battery monitoring and protecting unit electrically connected to the first wireless transceiving unit and configured to send a collected electrical signal parameter of a power supply battery of the bicycle to the first wireless transceiving unit and control the power supply battery according to a control instruction received from the first wireless transceiving unit. The first wireless transceiving unit is further configured to send the received electrical signal parameter to the second wireless transceiving unit, and send a control instruction received from a third wireless transceiving unit to the battery monitoring and protecting unit. The second wireless transceiving unit is further configured to send the received electrical signal parameter to the control unit. The third wireless transceiving unit is configured to send the control instruction received from an upper computer to the first wireless transceiving unit. The control unit is further configured to receive the electrical signal parameter. The upper computer is configured to generate a corresponding control instruction according to the electrical signal parameter and send the control instruction to the third wireless transceiving unit.

Preferably, the first wireless transceiving unit includes a first wireless transceiver corresponding to the torque transceiver and arranged inside the first housing, and a second wireless transceiver corresponding to the battery monitoring and protecting unit. The center-mounted control system further includes a third housing in which the power supply battery of the bicycle, the battery monitoring and protecting unit and the second wireless transceiver are arranged, or the center-mounted control system further includes a third housing in which the battery monitoring and protecting unit and the second wireless transceiver are arranged, and the third housing is fixedly connected to a battery box for the power supply battery of the bicycle.

Preferably, the first wireless transceiving unit includes a rectifying and voltage-stabilizing unit, a first signal processing unit and a radio-frequency emission unit, and the second wireless transceiving unit includes a power supply module and a radio-frequency receiving unit. The rectifying and voltage-stabilizing unit and the first signal processing unit are configured to process a received signal and send the processed signal to the radio-frequency emission unit. The radio-frequency emission unit is configured to send the received signal to the radio-frequency receiving unit. The radio-frequency receiving unit is configured to send the received signal to the control unit.

Preferably, the control unit includes an electrical motor controller configured to receive a signal sent from the radio-frequency emission unit, process the signal and control the electrical motor according to the processed signal. Or, the control unit includes an electrical motor controller and a main controller, the main controller is configured to receive a signal sent from the radio-frequency emission unit, process the signal and send the processed signal to the electrical motor controller, and the electrical motor controller is configured to control the electrical motor according to the processed signal. Or, the control unit includes an electrical motor controller, and a second signal processing unit provided inside the second wireless transceiving unit, the second signal processing unit is configured to receive a signal sent from the radio-frequency emission unit, process the signal and send the processed signal to the electrical motor controller, and the electrical motor controller is configured to control the electrical motor according to the processed signal. Or, the control unit includes an electrical motor controller, a main controller, and a second signal processing unit provided inside the second wireless transceiving unit, the second signal processing unit is configured to receive a signal sent from the radio-frequency emission unit, initially process the signal and send the initially-processed signal to the main controller; and the main controller is configured to receive the initially-processed signal, secondly process the initially-processed signal, and send the secondly-processed signal to the electrical motor controller, and the electrical motor controller is configured to control the electrical motor according to the secondly-processed signal.

Preferably, the center-mounted control system further includes a human-computer interaction unit connected to the control unit and configured to receive information inputted by a user, send the information to the control unit, receive information sent from the control unit and display the information.

Preferably, the torsion detector is a torsion sleeve, and the torsion sleeve is sleeved on the crank shaft.

The advantageous effects of the present application are as follows. (1) Wireless power supply, wireless transmission, torque detection, chain ring speed and direction detection, the electrical motor, and the controller and other components are integrated in the center-mounted control system, thus the system has a high integration level, and can be directly mounted and used on a normal bicycle without other parts, thereby facilitating machining, assembling, and maintaining. (2) The center-mounted control system is provided with the torsion detector, which optimizes a transmission mode of the torque, thus the torque can be detected before the chain ring rotates no matter a left foot pedal or a right foot pedal is stepped, thereby realizing the zero-speed start, and there is no need to use a software to simulate, and the bicycle has a good balance performance and will not shake. (3) The Hall sensor capable of measuring two channels of signal outputs is designed in the center-mounted control system, and can measure the rotation speed of the chain ring, and also can measure the rotation direction of the chain ring, thus misoperation and phenomena such as bicycle flying-off can be effectively prevented. (4) The clutch is provided on the transmission mechanism of the center-mounted control system, and the electrical motor is connected to the chain ring by the clutch, which ensures that the electrical motor may not be driven to rotate in the case that the rotation speed of the electrical motor is lower than the rotation speed of the chain ring, that is, the human force does not need to drive the electrical motor, thereby easing a burden of the human body. (5) The signal processing unit is provided on a wireless receiving board of the center-mounted control system to complete the processing of main signal data, thus the controller doesn't need an additional data operation, which reduces the requirement for the controller, and there is no need to provide a particular controller, which enhances a versatility of the center-mounted control system. (6) The center-mounted control system has a large torque detection range, a strong adaptability, and can be adapted to all groups and road conditions, which allows a rider to have a real and relaxing riding experience.

DETAILED DESCRIPTION

Figure 1:
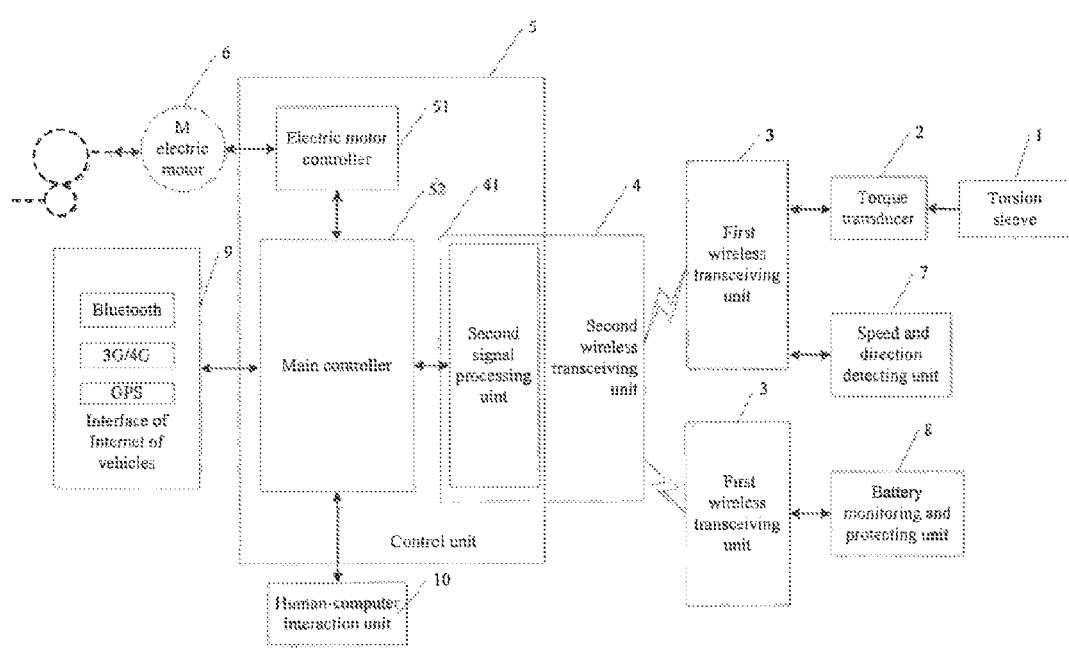
FIG. 1 is a schematic view showing the overall structure of a system according to the present application.

The technical solutions of the embodiments of the present application will be described clearly and completely hereinafter in conjunction with the drawings in the present application.

Direction in the present application is specifically described according to directions in FIGS. 1 to 6, that is, the directions of upward, downward, leftward, and rightward in FIGS. 1 to 6 are the directions of upward, downward, leftward, and rightward described in the present application.

As shown in FIGS. 1 to 6, a center-mounted control system for a bicycle is provided according to the present application, which includes a torsion detector 1, a torque transducer 2, a first wireless transceiving unit 3, a second wireless transceiving unit 4 and a control unit 5.

The torsion detector 1 is sleeved on a crank shaft 12 of a bicycle, and there is a certain clearance between the torsion detector 1 and the crank shaft 12. The torsion detector 1 is configured to detect a torque signal from the crank shaft 12, and transmit the detected torque signal to the torque transducer 2. Two ends of the crank shaft 12 are configured to connect a left foot pedal and a right foot pedal of the bicycle.

The torque transducer 2 is fixedly connected to the torsion detector 1 and is configured to sense the torque signal transmitted from the torsion detector 1 and send the torque signal to the first wireless transceiving unit 3. In the present application, the torque transducer 2 may be embodied as a strain bridge type torque transducer composed of multiple strain foils.

The first wireless transceiving unit 3 is electrically connected to the torque transducer 2 and is configured to receive the torque signal and send the torque signal to the second wireless transceiving unit 4.

The second wireless transceiving unit 4 is configured to receive the torque signal and send the torque signal to the control unit 5.

The control unit 5 is configured to receive the torque signal, process the torque signal and control an electrical motor 6 of the bicycle according to the processed torque signal. The electrical motor 6 according to the present application is installed below the crank shaft 12.

A first clutch 18 of the bicycle is sleeved on the crank shaft 12 and is fixedly connected to one end, close to a chain ring 13, of the torsion detector 1, and the chain ring 13 configured to mount a chain of the bicycle is fixedly connected to the first clutch 18. The first clutch 18 may be embodied as an overrun clutch.

Figure 3:
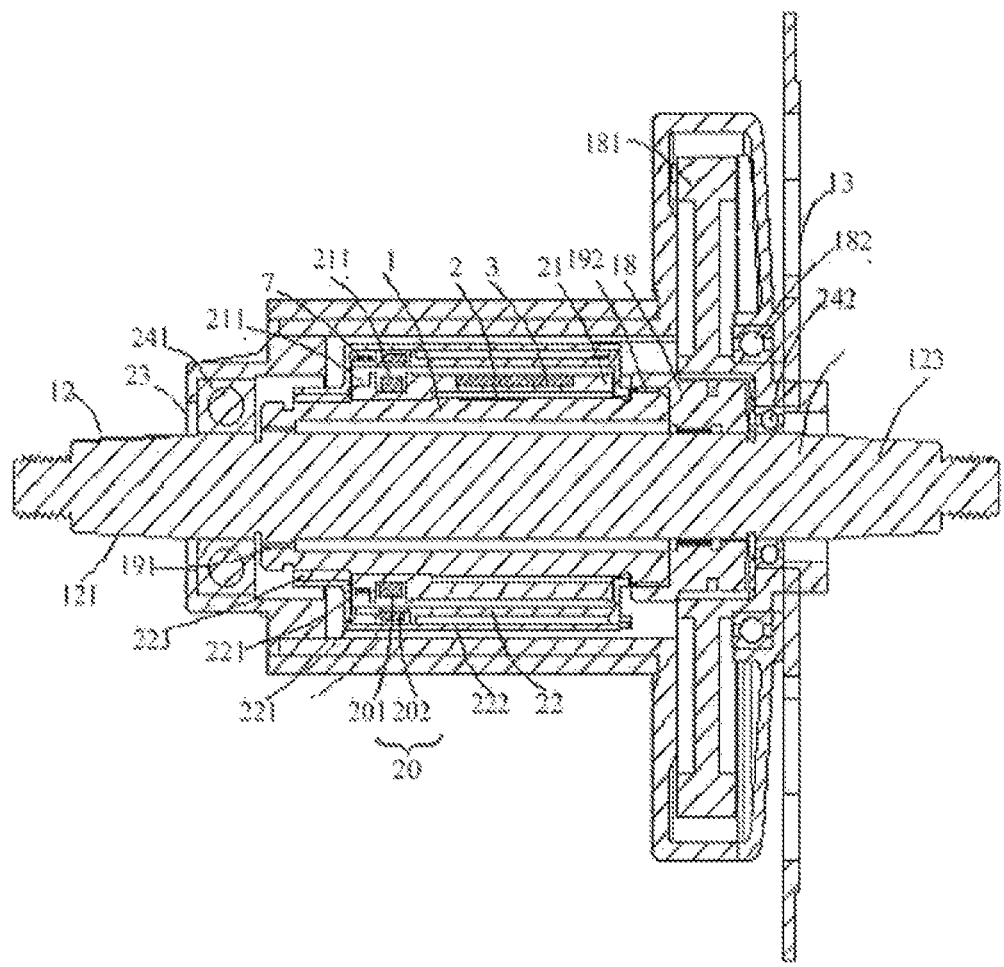
FIG. 3 is a sectional schematic view showing the structure of a first housing in FIG. 2.

As shown in FIG. 3, one end, away from the chain ring 13, of the torsion detector 1 is connected to the crank shaft 12 via a first spline 191, and one end, close to the chain ring 13, of the torsion detector 1 is fixedly connected to the first clutch 18 via a second spline 192.

Figure 6:
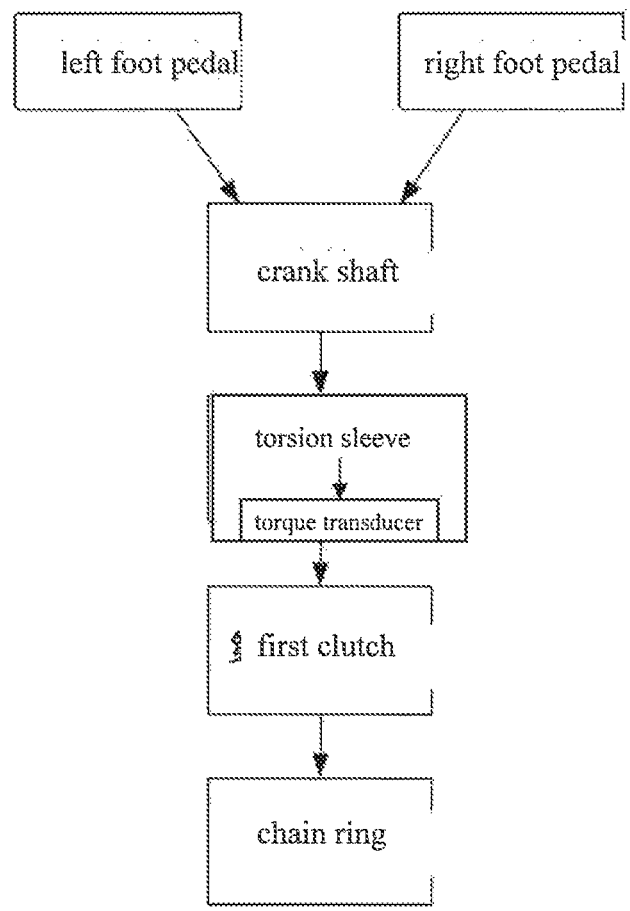
FIG. 6 is a schematic flow diagram showing the transmission process of a torque according to the present application.

Unlike the conventional solution that the torque transducer 2 is directly arranged on the crank shaft 12, in the present application, the torsion detector 1 is further provided on the crank shaft 12, thus the transmission process of the torque in the present application is different from the conventional solution. Reference is made to FIG. 6.

In the case that a left foot pedal is subjected to a force, the transmission process of the torque is from the left foot pedal to the crank shaft 12, to the torsion detector 1, to the torque transducer 2, to the first clutch 18, and then to the chain ring 13.

In the case that a right foot pedal is subjected to a force, the transmission process of the torque is from the right foot pedal to the crank shaft 12, to the torsion detector 1, to the torque transducer 2, to the first clutch 18, and then to the chain ring 13.

Thus no matter the force is applied by the left foot or the right foot, the transmission processes of the torque are the same, the torque transducer 2 may detect the torque signal ahead of the chain ring 13, thus the control unit 5 can drive the electrical motor 6 timely to assist a bicycle body in starting and running, thereby realizing a zero-speed start, and allowing the start to be more easy and labor-saving. At the same time, in the riding process, the balance sense between left and right is good, and phenomena such as missing the pedal and shaking won't occur.

As shown in FIG. 1, the center-mounted control system according to the present application further includes a speed and direction detecting unit 7 configured to detect a rotation speed and a rotation direction of the chain ring of the bicycle at the same time and transmit the detected rotation speed signal and rotation direction signal to the first wireless transceiving unit 3.

The first wireless transceiving unit 3 is further configured to receive the rotation speed signal and the rotation direction signal and send the rotation speed signal and the rotation direction signal to the second wireless transceiving unit 4, and further the rotation speed signal and the rotation direction signal are transmitted to the control unit 5 via the second wireless transceiving unit 4.

At this moment, the control unit 5 may process the rotation speed signal and the rotation direction signal, and control the electrical motor 6 via the processed rotation speed signal and rotation direction signal in combination with the torque signal before.

Since the speed and direction detecting unit 7 can detect the rotation speed signal and the rotation direction signal at the same time, the control unit 5 is allowed to control the electrical motor 6 by combining the rotation speed signal and the torque signal in the case that the control unit 5 determines that the chain ring 13 is rotating forward, and to close the electrical motor 6 in the case that the control unit 5 determines that the chain ring 13 is rotating backward, thereby effectively preventing the misoperation caused by an uncertain orientation identification, and preventing phenomena such as bicycle flying-off from occurring, and decreasing the hidden danger.

The speed and direction detecting unit 7 may be embodied as a Hall sensor, and obtain the rotation speed signal and the rotation direction signal by detecting, a magnetic signal of a magnetic ring 19 at a corresponding position. For detecting the rotation speed signal and the rotation direction signal at the same time, the Hall sensor according to the present application includes two Hall chips, and a peripheral circuit. The Hall chips may obtain a rotation direction signal of the chain ring 13 by calculating a phase difference between two detected magnetic signals. A rotation speed signal of the chain ring 13 may be obtained by one of the two magnetic signals or by performing "AND" operation between the two magnetic signals, and the rotation speed signal is a digital pulse signal. Of course, the detection of the rotation speed signal and the rotation direction signal at the same time may also be implemented via other structures, which will not be limited in the present application.

Components in the present application, such as the crank shaft 12, the torsion detector 1, and the first clutch 18, all need electric energy in an operational process. As shown in the FIG. 3, the system of the present application further includes a wireless power supply unit 20 configured to supply power to the above components. The wireless power supply unit 20 includes an inner coil 201 and an outer coil 202. Corresponding to the wireless power supply unit 20, a plastic inner ring 21 and a plastic outer ring 22 are further provided in the present application. The plastic inner ring 21 is sleeved on the torsion detector 1, fits close to the torsion detector 1, and rotates together with the torsion detector 1, and the plastic outer ring 22 is sleeved on the plastic inner ring 21. There is a certain clearance between the plastic outer ring 22 and the plastic inner ring 21, and the plastic inner ring 21 is rotatable with respect to the plastic outer ring 22. A first annular groove 211 and a second annular groove 221 are respectively provided at corresponding positions on an outer surface of the plastic inner ring 21 and an inner surface of the plastic outer ring 22. The inner coil 201 is arranged in the first annular groove 211 and the outer coil 202 is arranged in the second annular groove 221. Due to a relative motion between the plastic inner ring 21 and the plastic outer ring 22, an electromagnetic field is formed between the inner coil 201 and the outer coil 202, and when rotating in the electromagnetic field, the inner coil 201 generates the electric power required by the system. The wireless power supply manner used in the present application has the following advantages, it can effectively avoid phenomena, such as abrasion, heating, a poor contact, when a wire transmission such as a slip ring is employed, besides, with this manner using two coils, the solution is simple, a magnitude of voltage is not relevant to the speed of the bicycle, and a stable power supply can be provided in any case.

It should be noted that, another first annular groove 211 and another second annular groove 221 may be additionally provided at corresponding positions of the plastic inner ring 21 and the plastic outer ring 22 respectively. The speed and direction detecting unit 7 and the magnetic ring 19 may be arranged in the additionally provided first annular groove 211 and second annular groove 221 respectively.

For timely detecting a malfunction of a power supply battery of the bicycle, preventing overcharge or overdischarge of the battery, and elongating a service life of the battery, as shown in FIG. 1, the present application is further provided with a battery monitoring and protecting unit 8 electrically connected to the first wireless transceiving unit 3. The battery monitoring and protecting unit 8 is configured to collect an electrical parameter of the battery of the bicycle, such as voltage, current, temperature, power, and etc., and send the collected electrical signal parameter to the first wireless transceiving unit 3, and further the collected electrical signal parameter is sent to the control unit 5 via the first wireless transceiving unit 3 the second wireless transceiving unit 4. The control unit 5 may generate a corresponding control instruction according to the above electrical signal parameter and send the control instruction to the battery monitoring and protecting unit via the first wireless transceiving unit 3 and the second wireless transceiving unit 4, to further perform a corresponding operation on the battery.

Of course, the battery monitoring and protecting unit 8 according to the present application may communicate with an upper computer via the first wireless transceiving unit 3 and the second wireless transceiving unit and receive a management command of the upper computer.

The battery monitoring and protecting unit 8 may include a lithium battery protecting unit, a voltage measuring unit, a current measuring unit, a temperature measuring unit, and an analog-digital conversion unit. The voltage measuring unit, the current measuring unit and the temperature measuring unit are configured to detect parameters of a lithium-ion or li-polymer battery pack of the bicycle, and the analog-digital conversion unit is configured to convert the obtained signals and further send the signals to the upper computer or the control unit 5. The lithium battery protecting unit is configured to receive, via an inter-integrated circuit bus, a control instruction received by the first wireless transceiving unit 3 from the upper computer or the control unit 5, and control the lithium-ion or li-polymer battery pack based on the control instruction.

Of course, the present application is further provided with an interface 9 of Internet of vehicles, such as a Bluetooth interface, the third generation telecommunication interface, and the global position system interface, which may be used for extending corresponding functions later.

In embodiments of the present application, the first wireless transceiving unit 3 may include a rectifying and voltage-stabilizing unit, a first signal processing unit, and a radio-frequency emission unit, and the second wireless transceiving unit 4 may include a power supply module and a radio-frequency receiving unit.

The rectifying and voltage-stabilizing unit and the first signal processing unit are configured to process a received signal and send the processed signal to the radio-frequency emission unit; and the radio-frequency emission unit is configured to send a received signal to the radio-frequency receiving unit.

The radio-frequency receiving unit is configured to send out a received signal.

In a preferred embodiment of the present application, the second wireless transceiving unit 4 further includes a second signal processing unit 41 configured to process a received signal and send the processed signal out. In this case, the second signal processing unit acts as one part of the control unit 5.

The control unit 5 according to the present application may be embodied as the following manners.

In a first manner, the control unit 5 includes only an electrical motor controller 51 configured to receive and process the signal sent by the radio-frequency emission unit and control the electrical motor 6 according to the processed signal.

In a second manner, the control unit 5 includes an electrical motor controller 51 and a main controller 52.

The main controller 52 is configured to receive and process the signal sent by the radio-frequency emission unit and send the processed signal to the electrical motor controller 51, and the electrical motor controller 51 is configured to control the electrical motor 6 according to the processed signal.

In a third manner, the control unit 5 includes an electrical motor controller 51 and the above second signal processing unit.

The second signal processing unit is configured to receive the signal sent by the radio-frequency emission unit, process the signal and send the processed signal to the electrical motor controller 51, and the electrical motor controller 51 is configured to control the electrical motor 6 according to the processed signal.

In a fourth manner, the control unit 5 includes an electrical motor controller 51, a main controller 52, and the above second signal processing unit.

The second signal processing unit is configured to receive the signal sent by the radio-frequency emission unit, initially process the signal and send the initially-processed signal to the main controller 52.

The main controller 52 is configured to receive the initially-processed signal, secondly process the initially-processed signal, and send the secondly-processed signal to the electrical motor controller 51, and the electrical motor controller 51 is configured to control the electrical motor 6 according to the secondly-processed signal.

The second signal processing unit is used in both the third manner and the fourth manner, and by using the second signal processing unit 43, a load of the main controller 52 or the electrical motor controller 51 is greatly reduced, which is specifically reflected in the following way. The second signal processing unit analyzes and processes the rotation speed signal and the rotation direction signal of the chain ring outputted by the speed and direction detecting unit 7, and meanwhile is required to process the torque signal, and on this basis, the main controller 52 or the electrical motor controller 51 sends the rotation speed signal of the electrical motor 6 to the second signal processing unit, the second signal processing unit analyzes and calculates the received data and at last sends only a torque analog signal to the electrical motor controller 51 or the main controller 52. The electrical motor controller 51 or the main controller 52 only needs to process the torque analog signal to realize the reasonable control of the electrical motor 6. The above process has a low dependency on the electrical motor controller 51 or the main controller 52, thus it is not necessary to provide a particular controller, which allows a mode selection range of the controller to be large and the versatility of the system to be strong.

For facilitating the human-computer interaction, as shown in FIG. 1, the system of the present application is further provided with a human-computer interaction unit 10 connected to the control unit 5 and configured to display data of the control unit 5 or receive information inputted by the user and send the information to the control unit 5.

Since the bicycle is usually used outdoors, in a preferred embodiment of the present application, the above components are separately arranged in different housings, to prolong a service life of the center-mounted control system and prevent components of the system from causing damage to the user.

Figure 2:
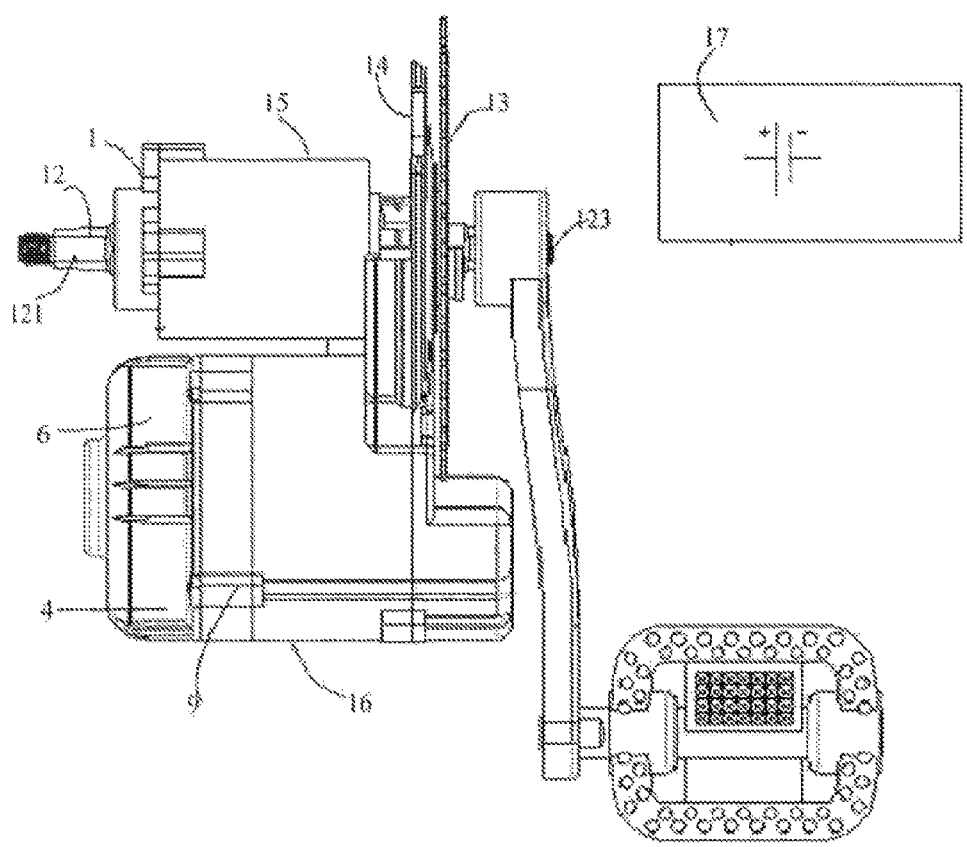
FIG. 2 is a schematic view showing the overall structure of the system having a housing according to the present application.

As shown in FIG. 2, the center-mounted control system includes a first housing 15, a second housing 16 and a third housing 17 which are arranged inside a bottom bracket (not shown) of the bicycle. The second housing 16 is hung below the first housing 15 and fixedly connected to the first housing 15. The first housing 15 and the second housing 16 may be embodied as an upper cover and a lower cover to form a sealed large housing.

The inner structure of the first housing is shown in FIG. 3, and the torsion detector 1, the torque transducer 2, the speed and direction detecting unit 7, the first clutch 18, the first wireless transceiving unit 3, the plastic inner ring 21, the plastic outer ring and the wireless power supply unit 20 are all located in the first housing 15.

A middle section 122 of the crank shaft 12 is inserted in the first housing 15 to ensure that an axis of the crank shaft 12 keeps consistent and doesn't deviate when the crank shaft 12 rotates. Two ends 121 and 123 of the crank shaft 12 are exposed outside the first housing 15. A seal ring 23 is provided at one end, away from the chain ring 13, of the crank shaft 12, that is the position where the end 121 is connected to the middle section 122, and the seal ring 23 is configured to fasten and seal the first housing 15 after the first housing 15 runs through the bottom bracket, thereby realizing the function of fixing, waterproofing, and dust prevention. One end, close to the end 121, of the middle section 122 of the crank shaft is connected to the seal ring 23 via a first bearing 241, and one end, close to the end 123, of the middle section 122 of the crank shaft is fixedly connected to the chain ring 13 via a second bearing 242.

The plastic outer ring 22 may be fixed on the first housing 15, for example, via a metal plate fixing sleeve 222. The metal plate fixing sleeve 222 is sleeved on the plastic outer ring 22, the plastic outer ring 222 is fixed to the first housing 15 via a retaining pin (not shown), and a left end of the metal plate fixing sleeve 222 is in smooth connection with the torsion detector 1 via a powder metallurgy member 223. The metal plate fixing sleeve 222 ensures a certain clearance between the plastic outer ring 22 and the plastic inner ring 21, thereby separating the two plastic rings from each other.

The first wireless transceiving unit 3 may be fixed to the surface of the plastic inner ring 21, and be electrically connected to the torque transducer 2. The first clutch 18 is provided with a gear 181, and one end of the gear 181 is fixed to the first housing 15 via a third bearing 182.

Figure 4:
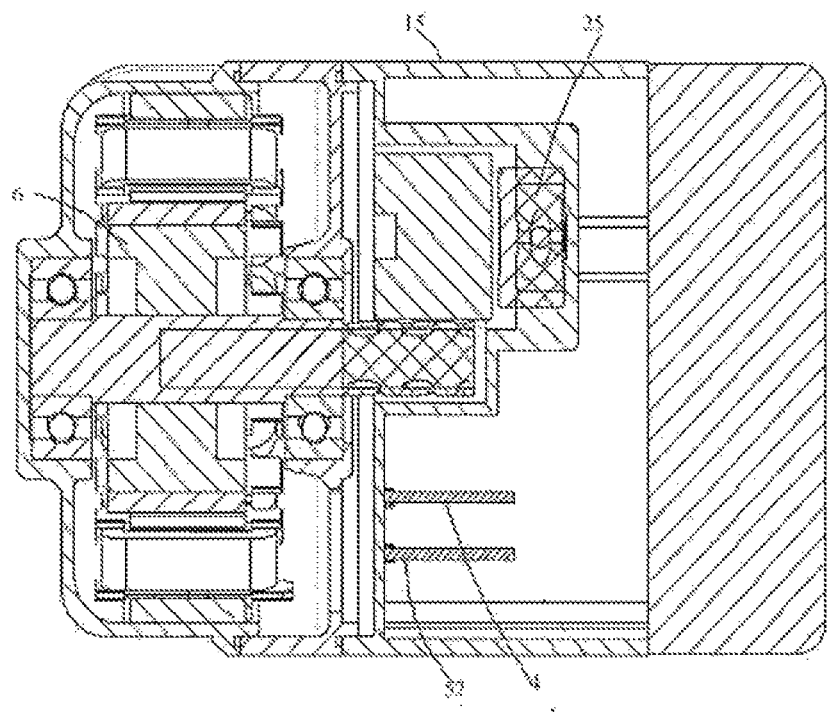
FIG. 4 is a sectional schematic view showing the structure of a second housing in FIG. 2.
Figure 5:
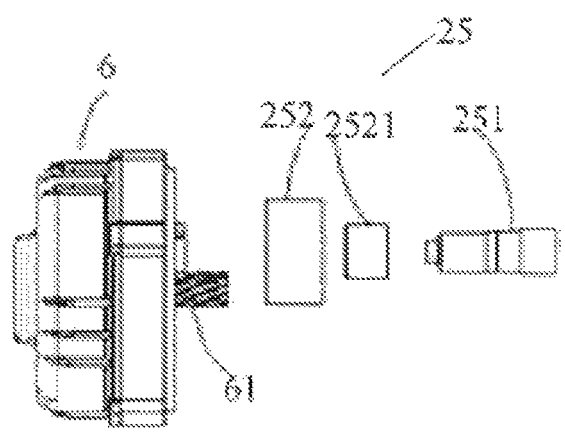
FIG. 5 is an exploded schematic view showing the structure of partial components in the first housing and the second housing.

The inner structure of the second housing 16 is shown in FIG. 4, and the electrical motor 6, the second wireless transceiving unit 4 and the main controller 52 are arranged inside the second housing 16. Besides, a transmission mechanism 25 is further provided in the second housing 16. As shown in FIG. 5, the transmission mechanism 25 includes a transmission shaft 251, and a second clutch 252 sleeved on the transmission shaft 251.

A motor shaft 61 of the electrical motor 6 meshes with a gear 2521 on the second clutch 252, and the transmission shaft 251 has one end inserted in the electrical motor 6 and another end meshing with the gear 181 on the first clutch 18 via a through hole provided in the first housing 15. Unlike the conventional solution in which the electrical motor 6 is directly connected to a gear mechanism, in the transmission mechanism 25 according to the present application, the second clutch 252 is further provided on the transmission shaft 252. The significance is that, in the case that the speed of the rider stepping on the foot pedal is greater than the speed of the electrical motor 6, the electrical motor 6 may be disengaged from the transmission shaft 251, thus the human force does not need to rotate the electrical motor 6, thus easing a burden of the human body. In particular, in the case that the power supply of the center-mounted control system is closed, the rider will not bear the rotation load of the electrical motor 6 as in a conventional power assist bicycle, and can ride the power assist bicycle easily as an ordinary bicycle. The second clutch 252 can also be embodied as an overrun clutch.

The above gear is preferably embodied as a plastic gear.

The third housing 17 is separated from the first housing 15 and the second housing 16, and two implementation methods may be provided. In one implementation method, the lithium battery monitoring and protecting unit 8 and the battery are arranged together inside a lithium battery box to share one housing. In as second implementation method, the third housing 17 is fixed on an outer shell of the lithium battery box and collects relevant data by a battery lead wire. The components inside the third housing include the battery monitoring and protecting unit 8 and the first wireless transceiving unit 3. Since the first wireless transceiving unit 3 is respectively provided in different housings, the first wireless transceiving unit 3 may include two independent wireless transceivers which are respectively provided inside the first housing 15 and the third housing 17.

The above torsion detector may be embodied as a torsion sleeve, and the torsion sleeve is sleeved on the crank shaft.

The center-mounted control system for the bicycle according to the present application is mainly used in a power assist bicycle, and provides kinetic energy required in advancing of the bicycle with a driving manner using the electric power to assist the human power. The center-mounted control system may realize the zero-speed start, and has an outstanding riding effect, at the same time can be adapted to all road conditions and can obtain a good riding effect when the power assist bicycle is ridden in a low speed and in a high speed, and has the advantages of being convenient to assemble and maintain, and operating stably, and etc., thereby enabling the rider to realize a real relaxing riding.

Technical contents and technical features of the present application are described above, however, for those skilled in the art, substitutions and modifications may be made based on the teaching or revelation of the present application without departing from the spirit of the present application. Therefore, the scope of the present application is not limited to the contents disclosed by the embodiments, but should include various modifications and substitutions without departing from the present application, and the scope of the present application is defined by the claims.

The invention claimed is:

1. A center-mounted control system for a bicycle, comprising a torsion detector, a torque transducer, a first wireless transceiving unit, a second wireless transceiving unit, and a control unit; wherein,
the torsion detector is sleeved on a crank shaft of the bicycle and configured to detect a torque signal of the crank shaft and transmit the detected torque signal to the torque transducer;
the torque transducer is fixedly connected to the torsion detector and configured to sense the torque signal transmitted from the torsion detector and send the torque signal to the first wireless transceiving unit;
the first wireless transceiving unit is electrically connected to the torque transducer and configured to receive the torque signal and send the torque signal to the second wireless transceiving unit;
the second wireless transceiving unit is configured to receive the torque signal and send the torque signal to the control unit;
the control unit is configured to receive the torque signal, process the torque signal and control an electrical motor of the bicycle according to the processed torque signal; and
a first clutch of the bicycle is sleeved on the crank shaft and is fixedly connected to one end, close to a chain ring, of the torsion detector, and the first clutch of the bicycle is fixedly connected to the chain ring configured to install a chain of the bicycle,
the center-mounted control system further comprises a speed and direction detecting unit configured to detect a rotation speed signal and a rotation direction signal of the chain ring and transmit the rotation speed signal and the rotation direction signal to the first wireless transceiving unit; wherein,
the first wireless transceiving unit is further configured to receive the rotation speed signal and the rotation direction signal and send the rotation speed signal and the rotation direction signal to the second wireless transceiving unit;
the second wireless transceiving unit is further configured to receive the rotation speed signal and the rotation direction signal and then transmit the rotation speed signal and the rotation direction signal to the control unit; and
the control unit is further configured to receive and process the rotation speed signal and the rotation direction signal, and control the electrical motor according to the processed torque signal, the processed rotation speed signal and the processed rotation direction signal,
wherein the system further comprises a magnetic ring, the speed and direction detecting unit is a Hall sensor, and the Hall sensor comprises two Hall chips and a peripheral circuit for the chips; and
the Hall sensor is configured to detect a magnetic signal of the magnetic ring, obtain a rotation speed signal according to the magnetic signal and output the rotation speed signal, and obtain a rotation direction signal of the chain ring according to a phase difference between two detected magnetic signals and output the rotation direction signal.

2. The center-mounted control system according to claim 1, wherein one end, away from the chain ring, of the torsion detector is connected to the crank shaft via a first spline, and one end, close to the chain ring, of the torsion detector is fixedly connected to the first clutch via a second spline.

3. The center-mounted control system according to claim 1, wherein the system further comprises a wireless power supply unit configured to supply power to the crank shaft, the torsion detector and the first clutch, an outer ring, and an inner ring inserted in the outer ring and rotatable with respect to the outer ring;
the wireless power supply unit comprises an inner coil and an outer coil;
the inner ring is sleeved on the torsion detector, and is rotatable together with the torsion detector;
two first annular grooves are provided in an outer surface of the inner ring, and two second annular grooves are provided in an inner surface of the outer ring at positions corresponding to the first annular grooves;
the inner coil is located in one of the first annular grooves, and the outer coil is located in the respective second annular groove; and
the magnetic ring is located in another first annular groove, and the speed and direction detecting unit is located in another second annular groove.

4. The center-mounted control system according to claim 3, wherein the system further comprises a first housing mounted in a bottom bracket of the bicycle;
the torsion detector, the torque transducer, the speed and direction detecting unit, the first clutch, the first wireless transceiving unit, the inner ring, the outer ring, and the wireless power supply unit are all located inside the first housing;
the outer ring is fixedly connected to the first housing, and the first wireless transceiving unit is fixed on the outer surface of the inner ring; and a middle section of the crank shaft is inserted in the first housing, and two ends of the crank shaft are exposed outside the first housing.

5. The center-mounted control system according to claim 4, wherein a seal ring is provided at one end, away from the chain ring, of the first housing; one end, away from the chain ring, of the middle section of the crank shaft is connected to the seal ring via a first bearing, and another end of the middle section of the crank shaft is fixedly connected to the chain ring.

6. The center-mounted control system according to claim 5, wherein the system further comprises a transmission mechanism;
the transmission mechanism comprises a transmission shaft, and a second clutch sleeved on the transmission shaft; and
a motor shaft of the electrical motor is configured to mesh with a gear on the second clutch, and the transmission shaft has one end inserted in the electrical motor and another end meshing with the gear on the first clutch via a through hole provided in the first housing.

7. The center-mounted control system according to claim 6, wherein the system further comprises a second housing fixedly connected below the first housing;
the electrical motor, the control unit, the transmission mechanism and the second wireless transceiving unit are arranged inside the second housing;
the electrical motor is mounted below the crank shaft; and another end of the transmission shaft is configured to mesh with the gear on the first clutch via a through hole provided in the second housing.

8. The center-mounted control system according to claim 7, wherein the gear is a plastic gear.

9. The center-mounted control system according to claim 7, wherein the system further comprises at least one interface of Internet of vehicles arranged in the second housing.

10. The center-mounted control system according to claim 7, wherein the first housing and the second housing form a sealed housing.

11. The center-mounted control system according to claim 10, wherein the system further comprises a battery monitoring and protecting unit electrically connected to the first wireless transceiving unit and configured to send a collected electrical signal parameter of a power supply battery of the bicycle to the first wireless transceiving unit and control the power supply battery according to a control instruction received from the first wireless transceiving unit;
the first wireless transceiving unit is further configured to send a received electrical signal parameter to the second wireless transceiving unit, and send a control instruction received from the second wireless transceiving unit to the electronic motor monitoring and protecting unit;
the second wireless transceiving unit is further configured to send the received electrical signal parameter to the control unit, and send the received control instruction to the first wireless transceiving unit; and
the control unit is further configured to receive the electrical signal parameter and generate a corresponding control instruction based on the electrical signal parameter, and send the control instruction to the second wireless transceiving unit.

12. The center-mounted control system according to claim 10, wherein the system further comprises a battery monitoring and protecting unit electrically connected to the first wireless transceiving unit and configured to send a collected electrical signal parameter of a power supply battery of the bicycle to the first wireless transceiving unit and control the power supply battery according to a control instruction received from the first wireless transceiving unit;
the first wireless transceiving unit is further configured to send the received electrical signal parameter to the second wireless transceiving unit, and send a control instruction received from a third wireless transceiving unit to the battery monitoring and protecting unit;
the second wireless transceiving unit is further configured to send the received electrical signal parameter to the control unit;
the third wireless transceiving unit is configured to send the control instruction received from an upper computer to the first wireless transceiving unit;
the control unit is further configured to receive the electrical signal parameter; and
the upper computer is configured to generate a corresponding control instruction according to the electrical signal parameter and send the control instruction to the third wireless transceiving unit.

13. The center-mounted control system according to claim 11, wherein the first wireless transceiving unit comprises a first wireless transceiver corresponding to the torque transceiver and arranged inside the first housing, and a second wireless transceiver corresponding to the battery monitoring and protecting unit; and
the center-mounted control system further comprises a third housing in which the power supply battery of the bicycle, the battery monitoring and protecting unit and the second wireless transceiver are arranged, or the center-mounted control system further comprises a third housing in which the battery monitoring and protecting unit and the second wireless transceiver are arranged, and the third housing is fixedly connected to a battery box for the power supply battery of the bicycle.

14. The center-mounted control system according to claim 1, wherein the first wireless transceiving unit comprises a rectifying and voltage-stabilizing unit, a first signal processing unit and a radio-frequency emission unit, and the second wireless transceiving unit comprises a power supply module and a radio-frequency receiving unit;
the rectifying and voltage-stabilizing unit and the first signal processing unit are configured to process a received signal and send the processed signal to the radio-frequency emission unit;
the radio-frequency emission unit is configured to send the received signal to the radio-frequency receiving unit; and
the radio-frequency receiving unit is configured to send the received signal to the control unit.

15. The center-mounted control system according to claim 14, wherein
the control unit comprises an electrical motor controller configured to receive a signal sent from the radio-frequency emission unit, process the signal and control the electrical motor according to the processed signal; or;
the control unit comprises an electrical motor controller and a main controller, the main controller is configured to receive a signal sent from the radio-frequency emission unit, process the signal and send the processed signal to the electrical motor controller, and the electrical motor controller is configured to control the electrical motor according to the processed signal;

or;

the control unit comprises an electrical motor controller, and a second signal processing unit provided inside the second wireless transceiving unit, the second signal processing unit is configured to receive a signal sent from the radio-frequency emission unit, process the signal and send the processed signal to the electrical motor controller, and the electrical motor controller is configured to control the electrical motor according to the processed signal;

or;

the control unit comprises an electrical motor controller, a main controller, and a second signal processing unit provided inside the second wireless transceiving unit, the second signal processing unit is configured to receive a signal sent from the radio-frequency emission unit, initially process the signal and send the initially-processed signal to the main controller; and the main controller is configured to receive the initially-processed signal, secondly process the initially-processed signal, and send the secondly-processed signal to the electrical motor controller, and the electrical motor controller is configured to control the electrical motor according to the secondly-processed signal.

16. The center-mounted control system according to claim 1, wherein the system further comprises a human-computer interaction unit connected to the control unit and configured to receive information inputted by a user, send the information to the control unit, receive information sent from the control unit and display the information.

17. The center-mounted control system according to claim 1, wherein the torsion detector is a torsion sleeve, and the torsion sleeve is sleeved on the crank shaft.

18. The center-mounted control system according to claim 12, wherein the first wireless transceiving unit comprises a first wireless transceiver corresponding to the torque transceiver and arranged inside the first housing, and a second wireless transceiver corresponding to the battery monitoring and protecting unit; and the center-mounted control system further comprises a third housing in which the power supply battery of the bicycle, the battery monitoring and protecting unit and the second wireless transceiver are arranged, or the center-mounted control system further comprises a third housing in which the battery monitoring and protecting unit and the second wireless transceiver are arranged, and the third housing is fixedly connected to a battery box for the power supply battery of the bicycle.

19. A center-mounted control system for a bicycle, comprising a torsion detector, a torque transducer, a first wireless transceiving unit, a second wireless transceiving unit, and a control unit; wherein, the torsion detector is sleeved on a crank shaft of the bicycle and configured to detect a torque signal of the crank shaft and transmit the detected torque signal to the torque transducer;

the torque transducer is fixedly connected to the torsion detector and configured to sense the torque signal transmitted from the torsion detector and send the torque signal to the first wireless transceiving unit;

the first wireless transceiving unit is electrically connected to the torque transducer and configured to receive the torque signal and send the torque signal to the second wireless transceiving unit;

the second wireless transceiving unit is configured to receive the torque signal and send the torque signal to the control unit;

the control unit is configured to receive the torque signal, process the torque signal and control an electrical motor of the bicycle according to the processed torque signal;

a first clutch of the bicycle is sleeved on the crank shaft and is fixedly connected to one end, close to a chain ring, of the torsion detector, and the first clutch of the bicycle is fixedly connected to the chain ring configured to install a chain of the bicycle;

wherein the first wireless transceiving unit comprises a rectifying and voltage-stabilizing unit, a first signal processing unit and a radio-frequency emission unit, and the second wireless transceiving unit comprises a power supply module and a radio-frequency receiving unit;

the rectifying and voltage-stabilizing unit and the first signal processing unit are configured to process a received signal and send the processed signal to the radio-frequency emission unit;

the radio-frequency emission unit is configured to send the received signal to the radio-frequency receiving unit; and the radio-frequency receiving unit is configured to send the received signal to the control unit.

\* \* \* \* \*